US012646407B2

(12) United States Patent
Adekunle et al.

(10) Patent No.: US 12,646,407 B2
(45) Date of Patent: Jun. 2, 2026

(54) SYSTEM AND METHOD FOR QUALITY ESTIMATION OF REPORTED TRAFFIC CONGESTION INCIDENT

(71) Applicant: HERE Global B.V., Eindhoven (NL)

(72) Inventors: Afolabi Adekunle, Aurora, IL (US); Arnold Sheynman, Northbrook, IL (US); Swetha Nutakki, Chicago, IL (US); Daniela Radakovic, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 172 days.

(21) Appl. No.: 18/394,572

(22) Filed: Dec. 22, 2023

(65) Prior Publication Data

US 2025/0209908 A1 Jun. 26, 2025

(51) Int. Cl.
*G08G 1/01* (2006.01)

(52) U.S. Cl.
CPC ......... *G08G 1/0133* (2013.01); *G08G 1/0112* (2013.01)

(58) Field of Classification Search
None
See application file for complete search history.

(56) References Cited

U.S. PATENT DOCUMENTS 8,972,192 B2 3/2015 Bespalov et al.
10,515,542 B2 12/2019 Littlejohn
2020/0143669 A1* 5/2020 Mulcahy .................. G06N 7/01
2024/0142264 A1* 5/2024 Stenneth ............ G01C 21/3811

FOREIGN PATENT DOCUMENTS

CN 101540101 A 9/2009
CN 102063789 B 5/2011

OTHER PUBLICATIONS

Kumar et al., "Study on road traffic congestion: A review", Jul. 9, 2021, 7 pages.

* cited by examiner

*Primary Examiner* — Peter D Nolan
*Assistant Examiner* — Michael F Whalen
(74) *Attorney, Agent, or Firm* — DITTHAVONG, STEINER & MLOTKOWSKI

(57) ABSTRACT

The disclosure provides a system, and a method for quality estimation of a traffic congestion incident reported by traffic system based on the information from one or more probe vehicles. The system is configured to identify one or more road segments and location information associated with the traffic congestion incident reported by traffic system based on the information from the one or more probe vehicles. A probe-based space-time diagram is generated based on the identified one or more road segments and location information associated with the traffic congestion incident reported by traffic system based on the information from the one or more probe vehicles. Ground truth is inferred for the traffic congestion incident. The generated probe-based space-time diagram is compared with the inferred ground truth for quality estimation of the traffic congestion incident reported by traffic system based on the information from the one or more probe vehicles.

13 Claims, 10 Drawing Sheets

100C

| | 15:00 | 15:05 | 15:10 | 15:15 | 15:20 | 15:25 | 15:30 | 15:35 | 15:40 | 15:45 | 15:50 | 15:55 |
|---|---|---|---|---|---|---|---|---|---|---|---|---|
| 1199200697 | 35 | 23 | 33 | 33 | 31 | 41 | 40 | 33 | 41 | 41 | 33 | 33 |
| 1221993910 | 46 | 38 | 43 | 40 | | 45 | 44 | 44 | | 46 | 20 | 40 |
| 1221993911 | 40 | 42 | 43 | 42 | | 41 | 44 | 49 | 49 | 53 | 36 | 41 |
| 53482228 | 41 | 40 | 42 | 42 | | 41 | 39 | 37 | 46 | 43 | 46 | 46 |
| 53482103 | 39 | 31 | 34 | 44 | 32 | 27 | 35 | 43 | 42 | 50 | 38 | 42 |
| 792411482 | 28 | 4 | 27 | 35 | | 30 | 34 | 45 | 42 | 43 | 48 | 37 |
| 792411483 | 25 | 16 | 18 | 26 | | 23 | 30 | 37 | 36 | 36 | 6 | 20 |
| 572663745 | 20 | 18 | 17 | 21 | 24 | 26 | | 31 | 32 | | 24 | 27 |
| 572663771 | 11 | 11 | 17 | 13 | | 4 | 19 | 29 | 23 | 44 | | 21 |
| 572663772 | 18 | 7 | 14 | 10 | 18 | 4 | 15 | 16 | 23 | 13 | 10 | 16 |

119 121 115 117

FIG. 1C

SYSTEM AND METHOD FOR QUALITY ESTIMATION OF REPORTED TRAFFIC CONGESTION INCIDENT

TECHNICAL FIELD

The present disclosure generally relates to traffic management systems, and more particularly relates to system and method for quality estimation of reported traffic congestion incident.

BACKGROUND

Traffic congestion is an everyday event that affects travel and delay times for commuters. Thus, the reported traffic congestions must be accurate as it is crucial for businesses or individuals to make critical decisions when travelling from one place to another. The traffic congestions (or traffic jams) are considered as incidents when level of congestion reaches a predefined threshold. The traffic congestion incidents depict the road conditions by reporting location of the congestion on road segments and along with spatial and temporal information. The quality of the reported traffic congestion incidents in real time is very important for road users.

Therefore, there is a need to have a method to measure quality of corresponding reported traffic congestion incidents.

Based on the foregoing discussion, there exists a need for an efficient system and method that overcomes the above stated disadvantages.

BRIEF SUMMARY

The traffic congestion incidents are reported by real time probes (information from floating cars), and to report accurate traffic information, probe data needs to be filtered as it includes noise data as well. In the current systems, due to the noise data in the probe data, useful data may be lost and reported real time traffic condition may not match true traffic condition. Also, sometimes there is not enough probe data on road segments to report any meaningful information. Another problem with the current systems is the latency or delay in accessing the probe data on road segments in real time, where traffic congestion incidents may be clearing while real time reporting indicates that it is just forming. This is a difficult problem to solve because only the real time data needs to be utilized to determine the traffic condition on the road.

A system and a method are provided for quality estimation of a traffic congestion incident reported by a traffic system based on the real time information (probes) received from floating cars In one aspect, a system for quality estimation of a reported traffic congestion incident is disclosed. The system comprises at least one non-transitory memory configured to store computer-executable instructions and at least one processor configured to execute the computer-executable instructions to identify one or more road segments and location information associated with the traffic congestion incident based on the information reported by the one or more probe vehicles. The at least one processor is configured to generate a probe-based space-time diagram based on the identified one or more road segments and location information associated with the traffic congestion incident based on the information reported by the one or more probe vehicles. The at least one processor is configured to infer ground truth for the traffic congestion incident. The at least one processor is further configured to compare the generated probe-based space-time diagram with the inferred ground truth for quality estimation of the traffic congestion incident based on the information reported by the one or more probe vehicles.

According to an example embodiment, the probe-based space-time diagram comprises space-time tiles.

According to an example embodiment, to infer the ground truth for the traffic congestion incident, the at least one processor is configured to: gather probe data from the one or more probe vehicles; sort the probe data into space-time tiles; read the probe data from each space-time tile; combine speeds of each of the one or more probe vehicles to create partial inferred speed to be used as the inferred ground truth; calculate speed based on at least one of: average or median of filtered probe data; and determine the most adequate ground truth by leveraging an access to the probe data before and after reporting of the traffic congestion incident.

According to an example embodiment, the filtered probe data is generated by filtering out outliers within each space-time tile before averaging.

According to an example embodiment, the inferred ground truth is complemented with at least one of or a combination of: crowd sourcing, cameras on the one or more road segments, traffic patterns, sensors of the one or more probe vehicles, or traffic providers.

According to an example embodiment, for quality estimation of the traffic congestion incident based on the information reported by the one or more probe vehicles, the at least one processor is configured to: compute quality metric as a ratio of area in the probe-based space-time diagram where the traffic congestion incident based on the information reported by the one or more probe vehicles and the inferred ground truth overlap and area of the inferred ground truth; and compare the ratio with a predefined threshold.

According to an example embodiment, the quality metric is computed as a ratio of area in the probe-based space-time diagram in which the traffic congestion incident based on the information reported by the one or more probe vehicles and inferred ground truth agree or exhibit overlap and total area of the probe-based space-time diagram.

According to an example embodiment, at least one processor is configured to consider the traffic congestion incident based on the information reported by the one or more probe vehicles accurate if the computed ratio is more than the predefined threshold.

According to an example embodiment, the at least one processor is configured to perform quality estimation for a plurality of traffic congestion incidents.

According to an example embodiment, to perform quality estimation for each of the plurality of traffic congestion incidents, the at least one processor is configured to create a probe-based space-time diagram for each of the plurality of traffic congestion incidents associated with the one or more road segments.

In another aspect, a method for quality estimation of a traffic congestion incident reported by one or more probe vehicles is disclosed. The method includes identifying one or more road segments and location information associated with the traffic congestion incident based on the information reported by the one or more probe vehicles. The method includes generating a probe-based space-time diagram based on the identified one or more road segments and location information associated with the traffic congestion incident based on the information reported by the one or more probe vehicles. Further, the method includes inferring ground truth for the traffic congestion incident based on the probe-based space-time diagram. The method includes comparing the generated probe-based space-time diagram with the inferred ground truth for quality estimation of the traffic congestion incident based on the information reported by the one or more probe vehicles.

In additional method embodiments, the method includes gathering probe data from the one or more probe vehicles; sorting the probe data into space-time tiles; reading the probe data from each space-time tile; combining speeds of each of the one or more probe vehicles to create partial inferred speed to be used as the inferred ground truth; calculating speed based on at least one of: average or median of filtered probe data; and determining the most adequate ground truth by leveraging an access to the probe data before and after reporting of the traffic congestion incident.

In additional method embodiment, the method includes computing space-time accuracy as a ratio of area in the probe-based space-time diagram where the traffic congestion incident based on the information reported by the one or more probe vehicles and the inferred ground truth incidents overlap; and comparing the ratio with a predefined threshold.

In yet another aspect, a computer program product is provided, the computer program product including a non-transitory computer readable medium having stored thereon computer executable instructions which when executed by at least one processor, cause the processor to carry out operations. The operations cause the at least one processor to identify one or more road segments and location information associated with a traffic congestion incident based on information from one or more probe vehicles. The operations further cause the at least one processor to generate a probe-based space-time diagram based on the identified one or more road segments and the location information associated with the traffic congestion incident based on the information from the one or more probe vehicles. The operations further cause the at least one processor to infer ground truth for the traffic congestion incident based on the probe-based space-time diagram. The operations further cause the at least one processor to compare the generated probe-based space-time diagram with the inferred ground truth for quality estimation of the traffic congestion incident based on the information from the one or more probe vehicles.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1A:
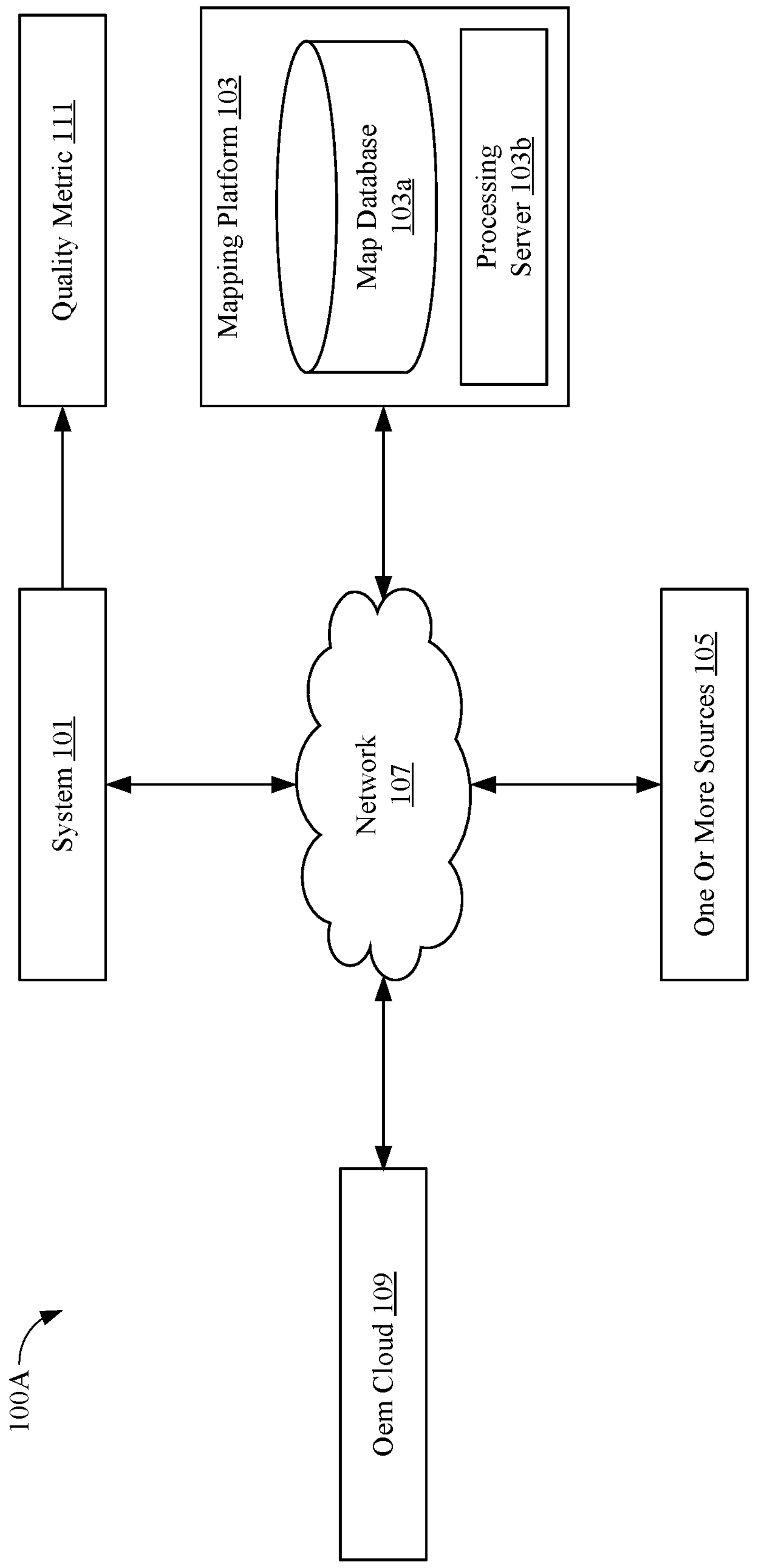
Figure 1B:
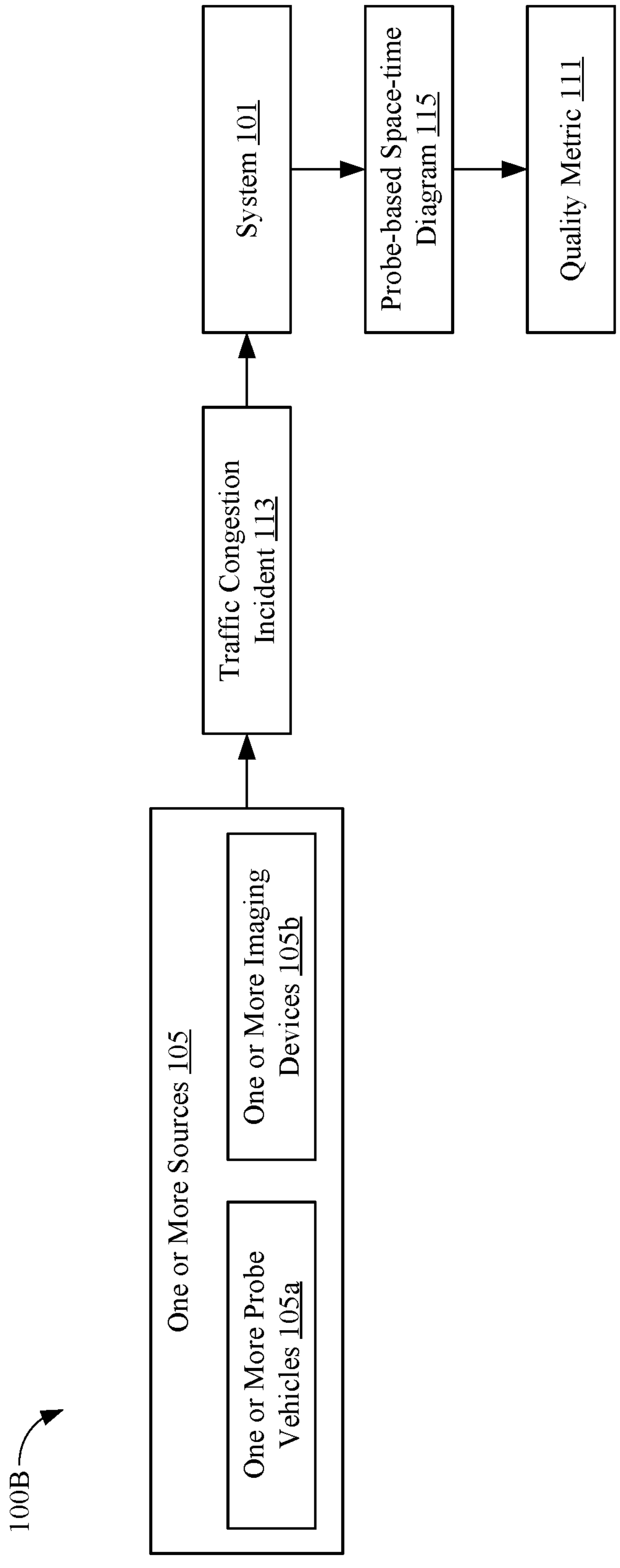
Figure 2A:
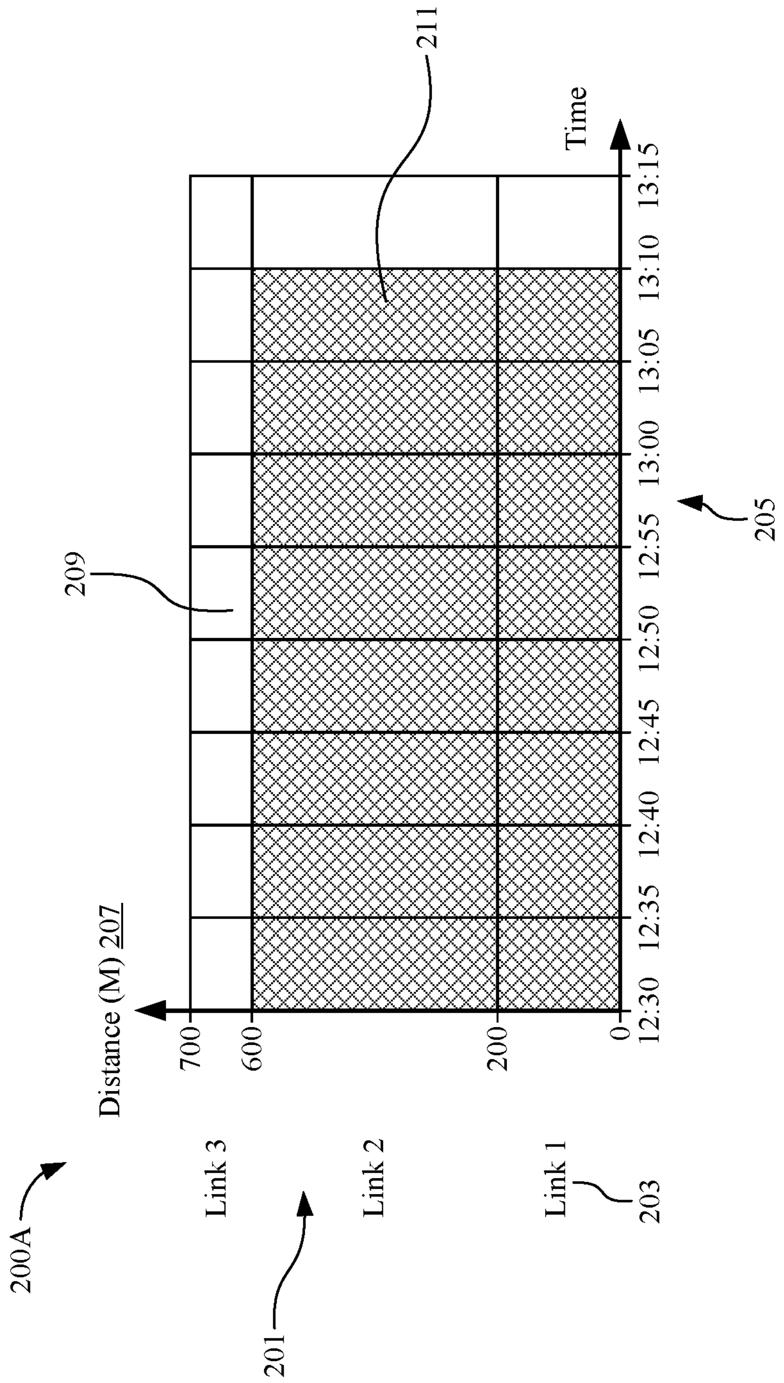
Figure 2B:
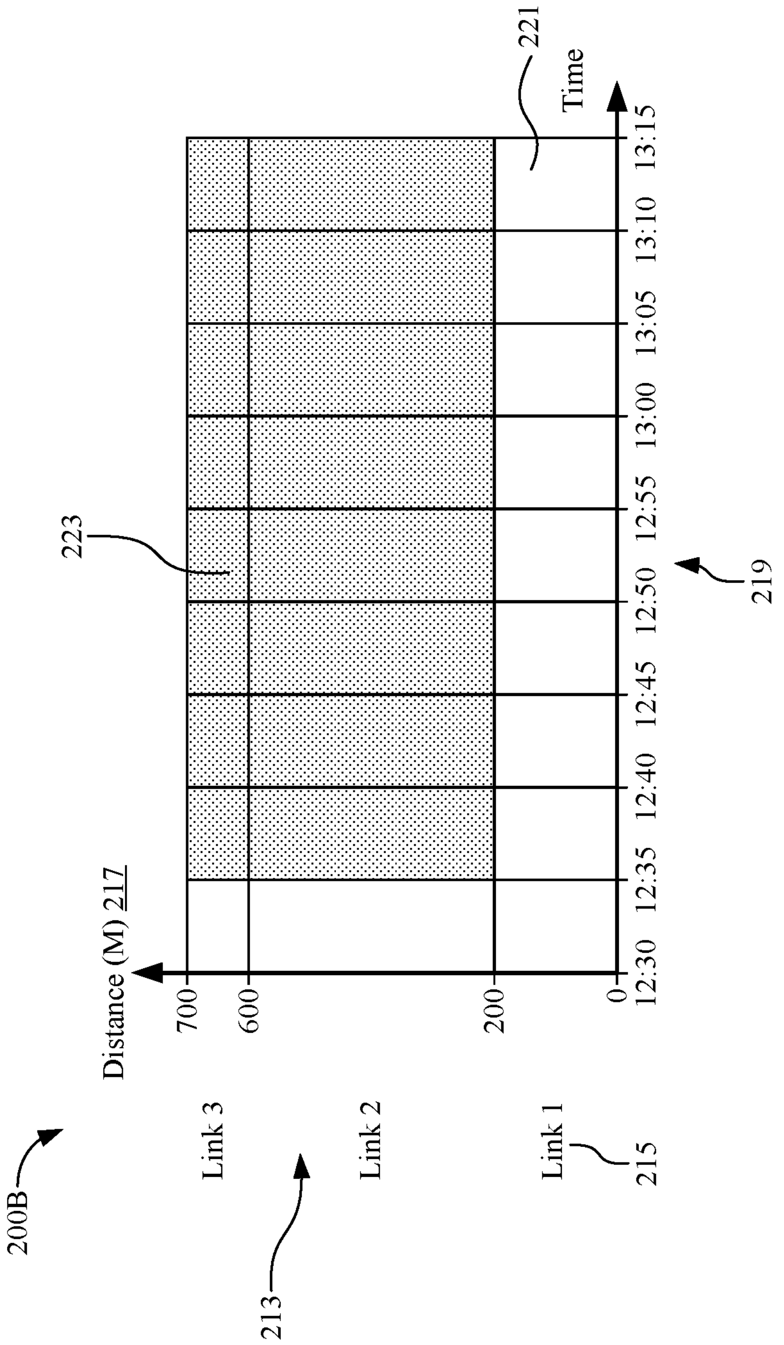
Figure 3A:
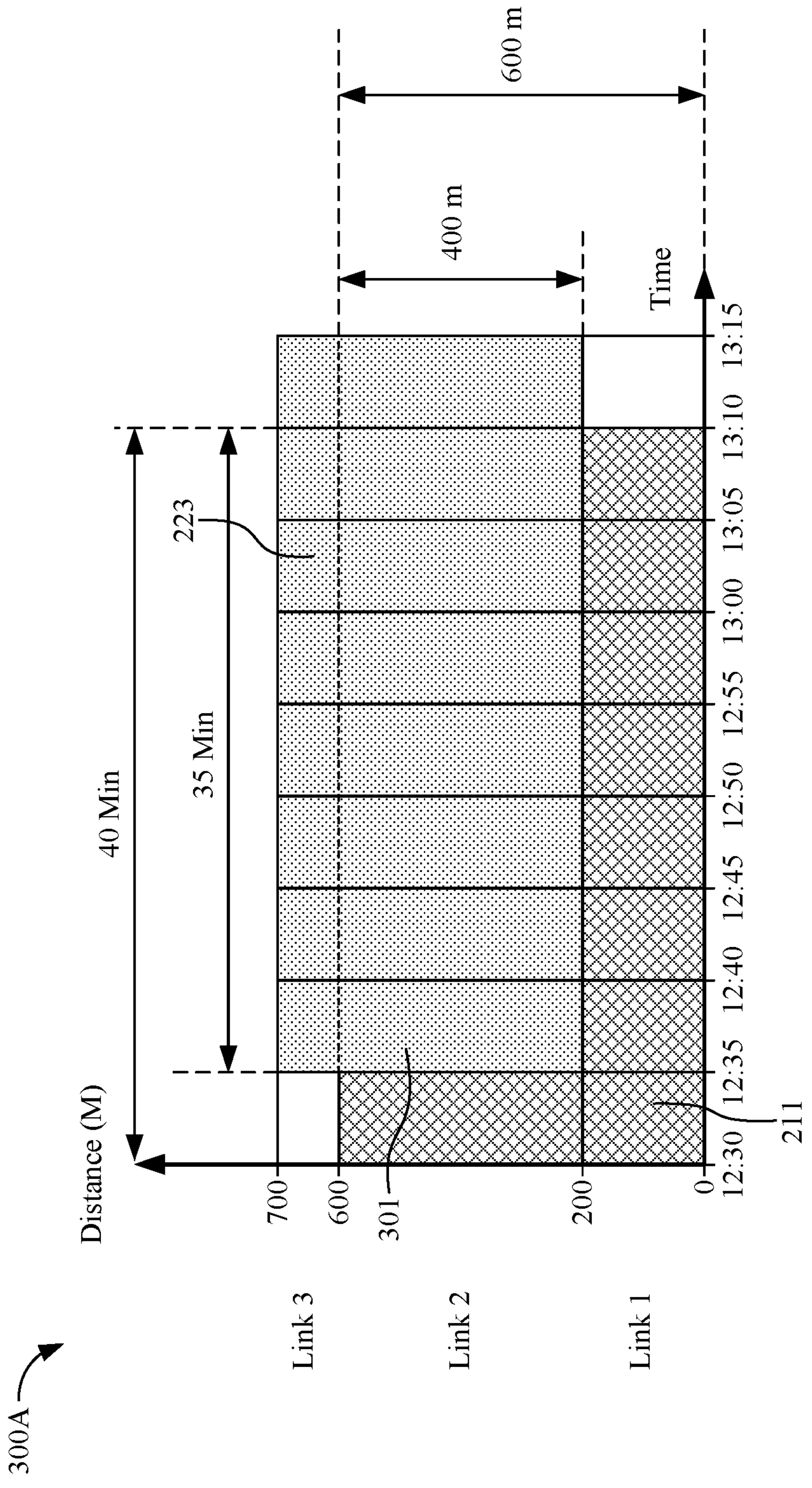
Figure 3B:
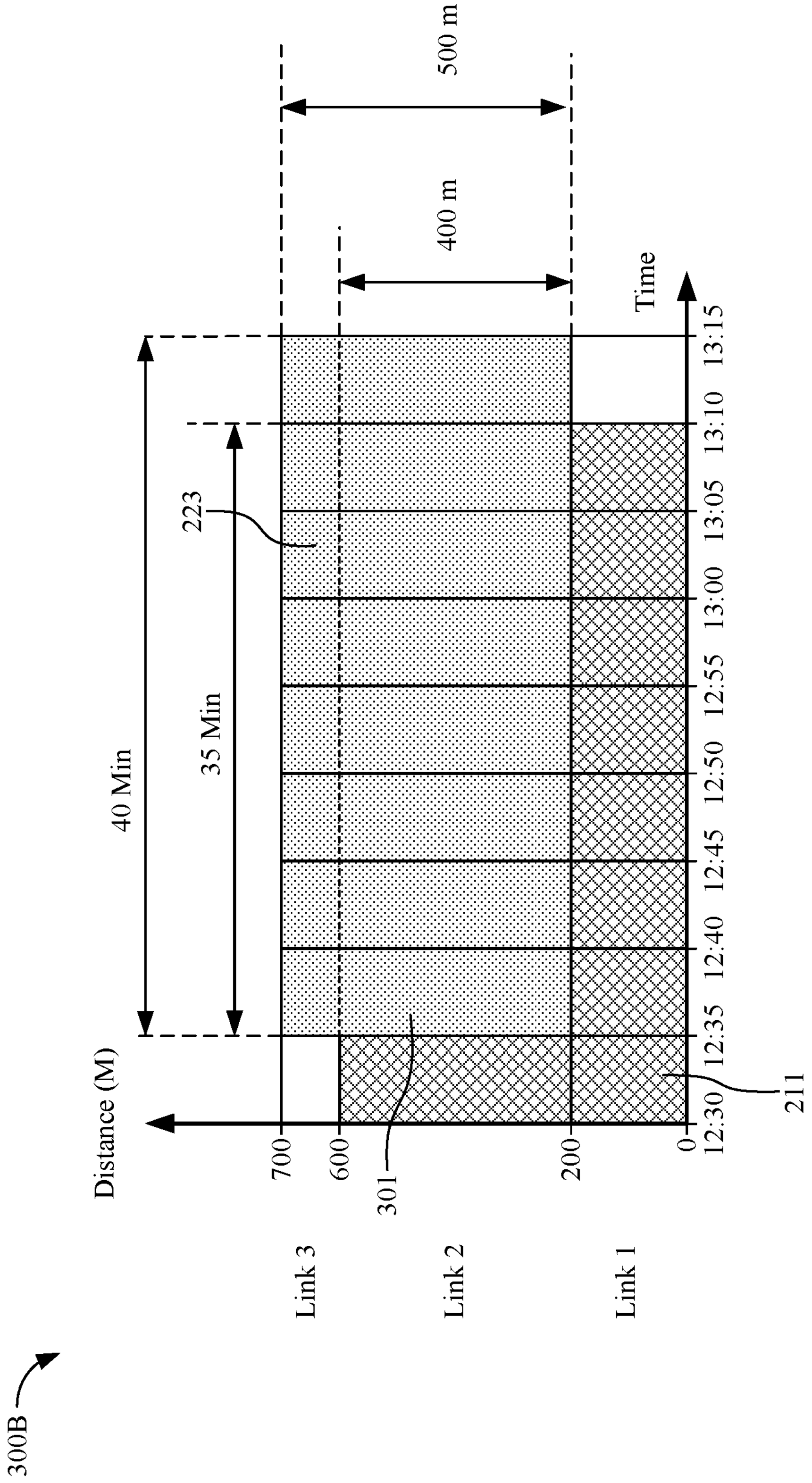
Figure 3C:
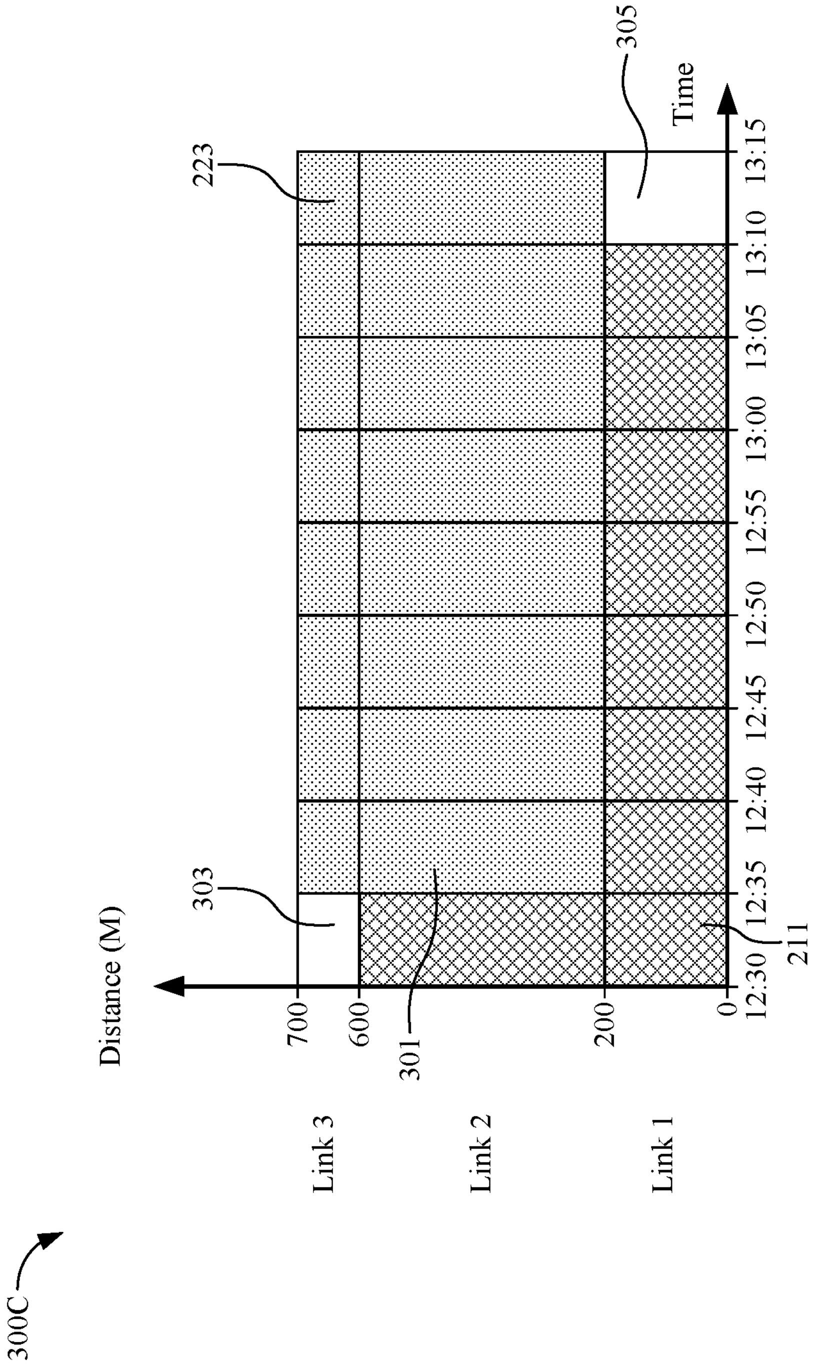

Having thus described example embodiments of the disclosure in general terms, reference will now be made to the accompanying drawings, which are not necessarily drawn to scale, and wherein;

FIG. 1A illustrates a network environment of a system for quality estimation of a traffic congestion incident, in accordance with an example embodiment;

FIG. 1B illustrates a block diagram for generation of quality metric, in accordance with an example embodiment;

FIG. 1C illustrates an exemplary diagram depicting probe-based space-time diagram generated by the system, in accordance with an example embodiment;

FIG. 2A illustrates an exemplary diagram depicting space-time diagram of a ground truth incident, in accordance with an example embodiment;

FIG. 2B illustrates an exemplary diagram depicting probe-based space-time diagram of the traffic congestion incident, in accordance with an example embodiment;

FIG. 3A illustrates an exemplary probe-based space-time diagram for computing space-time accuracy associated with congestion incident detection, in accordance with an example embodiment;

FIG. 3B illustrates an exemplary probe-based space-time diagram for computing space-time accuracy associated with congestion incident precision, in accordance with an example embodiment;

FIG. 3C illustrates an exemplary probe-based space-time diagram for computing space-time accuracy associated with congestion incident accuracy, in accordance with an example embodiment.

Figure 4:
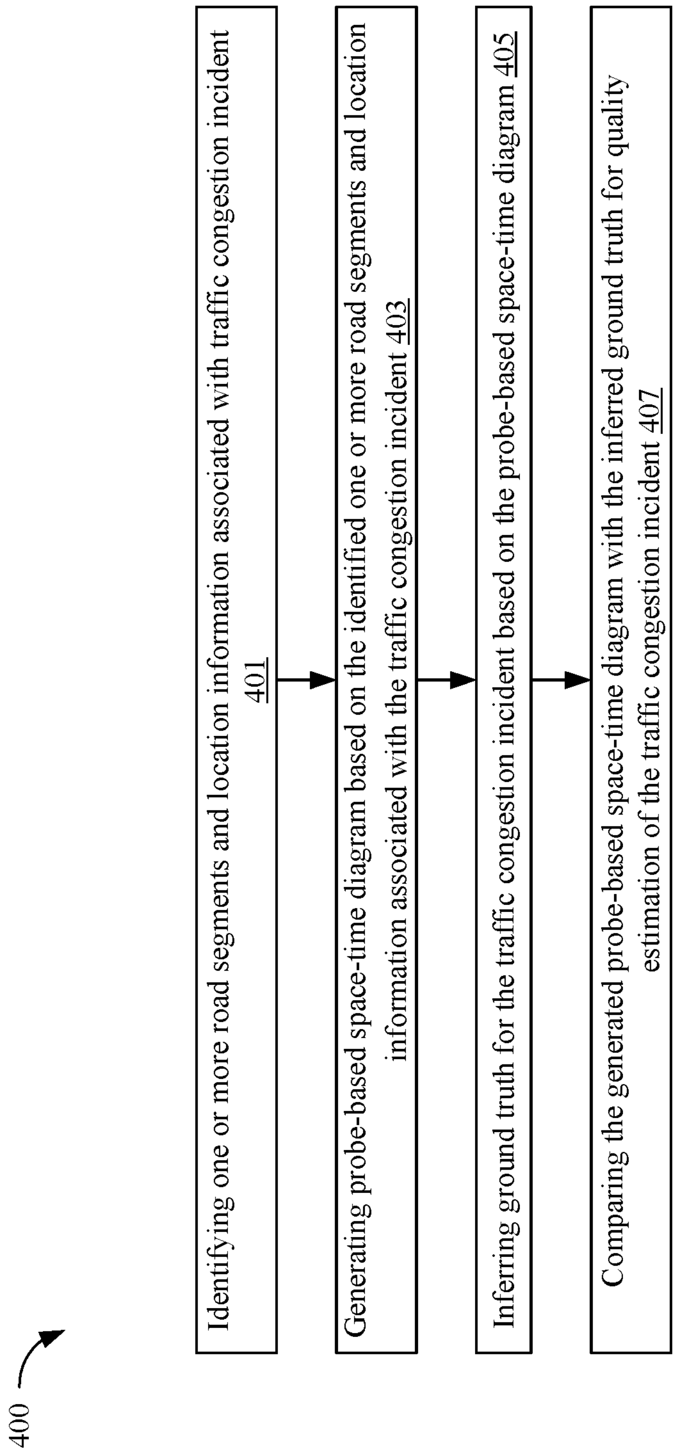
Figure 5:
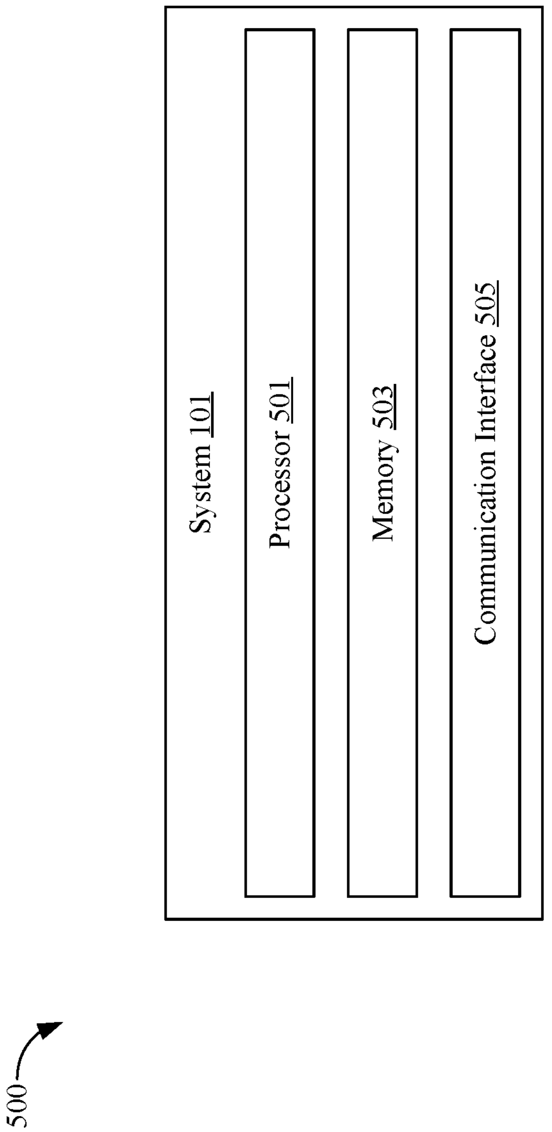

FIG. 4 illustrates a flowchart of a method for quality estimation of the traffic congestion incident based on information received from one or more probe-vehicles, in accordance with an example embodiment; and FIG. 5 illustrates a block diagram of a system for quality estimation of the traffic congestion incident, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to “one embodiment” or “an embodiment” means that a particular feature, structure, or characteristic described in connection with the embodiment is included in at least one embodiment of the present disclosure. The appearance of the phrase “in one embodiment” in various places in the specification are not necessarily all referring to the same embodiment, nor are separate or alternative embodiments mutually exclusive of other embodiments. Further, the terms “a” and “an” herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms “data,” “content,” “information,” and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a “computer-readable storage medium,” which refers to a non-transitory physical storage medium (for example, volatile or non-volatile memory device), may be differentiated from a "computer-readable transmission medium," which refers to an electromagnetic signal.

The embodiments are described herein for illustrative purposes. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

The traffic congestion incidents are reported by a traffic system based on the real time information received from probe vehicles (information from floating cars), and to report accurate traffic information, probe data needs to be filtered as it includes noise data as well. In the current systems, due to the noise data in the probe data, useful data may be lost and reported real time traffic condition may not match true traffic condition. The error or difference in the real time reporting versus the true traffic condition on the road needs to be accurately measured to make necessary adjustment to algorithms for smoothing real time data or filtering for improving quality metrics. Another problem with the current systems is the latency or delay in accessing the probe data on road segments in real time, where traffic congestion incidents may be clearing while real time reporting indicates that it is just forming. These quality metrics may help define the real time window that should be used in reporting real time traffic congestion incidents to compensate for latency. Analysis of some congestion incident examples shows that quality metrics of corresponding reports is not often adequate to reality. The quality metrics commonly requested by municipal and government customers are majorly due to: spatial start error, spatial end error, temporal start error, and temporal end error.

To overcome the above mentioned disadvantages, a system and method for quality estimation of traffic congestion incidents are described with reference to FIG. 1A, FIG. 1B, FIG. 1C, FIG. 2, FIG. 3A, FIG. 3B, FIG. 4, and FIG. 5.

FIG. 1A illustrates a network environment 100A of a system 101 for quality estimation of a traffic congestion incident, in accordance with an example embodiment. The system 101 may be communicatively coupled to a mapping platform 103, one or more sources 105 and an OEM (Original Equipment Manufacturer) cloud 109 via a network 107. Additional, different, or fewer components may be provided.

The system 101 may be associated with the one or more sources 105. Further, in one embodiment, the system 101 may be a standalone unit configured to perform quality estimation of a traffic congestion incident reported by one or more sources 105. Alternatively, the system 101 may be coupled with an external device such as a communication device (mobile phone). The system 101 may comprise or form the traffic system that is capable of reporting traffic congestion incidents, based on real time information received from probe vehicles.

In some embodiments, the system 101 receives reports of traffic incidents, the reports are based on information received from one or more floating cars, that are also referred to an probes. The traffic system is able to capture this information in the form of the reports, such as traffic incident reports. To that end, the traffic system may be the mapping platform 103 that is able to receive the information from the floating cars and store the information in a map database 103 associated with the mapping platform 103.

In some example embodiments, the system 101 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to a user of the vehicle. In such example embodiments, the system 101 may comprise a processing means such as a central processing unit (CPU), storage means such as on-board read only memory (ROM) and random access memory (RAM).

The system 101 may be configured to perform in operation, such as receiving a traffic congestion incident report by the one or more sources 105 and identifying one or more road segments and location information associated with the traffic congestion incident reported by the one or more sources 105. In an example, the one or more road segments may corresponds to links or segments representing roads, streets, or paths, as may be used in calculating a route or recorded route information for navigation of vehicles. The system 101 is further configured to generate a probe-based space-time diagram (shown in FIG. 1B) based on the identified one or more road segments and location information associated with the traffic congestion incident reported by the one or more sources 105. The system 101 is further configured to infer ground truth for the traffic congestion incident and compares the generated probe-based space-time diagram with the inferred ground truth for quality estimation of the traffic congestion incident reported by the one or more sources 105 (further explained in FIG. 1B).

The system 101 may be configured to perform quality estimation to calculate quality metric 111 for the traffic congestion incident, based on the comparison. The one or more operations of the system 101 are further described in detail, for example, in FIG. 4.

The system 101 is communicatively coupled to the mapping platform 103. The mapping platform 103 may further include the map database **103*a* and a processing server 103*b*. The map database 103*a* may include pre-historic traffic congestion incident data record. In addition, the map database 103*a*** may include data associated with the one or more road segments.

The processing server **103*b* may be one or more computing nodes. In general, processing server is a computer program or device that provides functionality for other programs or devices. The processing server 103*b* provides various functionalities, such as sharing data or resources among multiple clients, or performing computation for a client. However, those skilled in the art would appreciate that the system 101 may be connected to a greater number of processing servers. The system 101 may be configured to access the map database 103*a* via network 105 and the processing server 103*b*. The network 107 includes a satellite network, a telephone network, a data network (local area network, metropolitan network, and wide area network), distributed network, and the like. In one embodiment, the network 107 is internet. In another embodiment, the network 107 is a wireless mobile network. In yet another embodiment, the network 107 is a combination of the wireless and wired network for optimum throughput of data extraction and transmission. The network 107 includes a set of channels. Each channel of the set of channels supports a finite bandwidth. The finite bandwidth of each channel of the set of channels is based on capacity of the network 107. In addition, the network 107 connects the system 101 to the mapping platform 103 using a plurality of methods. The plurality of methods used to provide network connectivity to the system 101** may include 2G, 3G, 4G, 5G, and the like.

The network connects the system 101 to the OEM cloud 109. The OEM cloud 109 may be configured to anonymize any data received from the one or more sources 105, before using the data for further processing, such as before sending the data to the mapping platform 103. In some embodiments, the OEM cloud 109 includes historic data associated with the one or more road segments and traffic congestion incidents reported by a plurality of vehicles. The system 101 performs quality estimation of the traffic congestion incident to update the map database 103*a* of the mapping platform 103.

The system 101 is associated with the one or more sources 105 for receiving the traffic congestion incident report. The one or more sources 105 are further explained with reference to FIG. 1B.

FIG. 1B illustrates a block diagram 100B for generation of quality metric, in accordance with an example embodiment. The block diagram 100B includes the one or more sources 105, and the system 101. The one or more sources 105 include one or more probe vehicles 105*a* and one or more imaging devices 105*b*. In general, probe vehicles are such vehicles that participate in traffic flow and are capable of determining experienced traffic conditions and transmitting these to a traffic center. In addition, probe vehicles are used for traffic operations monitoring, traffic congestion incidents, and route guidance applications. In an embodiment, each of the one or more probe vehicles 105*a* is traveling on the identified one or more road segments. The probe vehicles 105*a* are also interchangeably referred to as floating cars without deviating from the scope of the present disclosure.

In an example, the one or more probe vehicles 105*a* are configured to capture road segment average speed, and report traffic congestion incident 113 for the one or more road segments. The one or more imaging devices 105*b* may correspond to cameras installed on a road side to capture traffic conditions on the one or more road segments. In an example, the one or more imaging devices 105*b* are utilized to capture the traffic congestion incident 113. The traffic congestion incident 113 corresponds to a condition in transport that is characterized by slower speeds, longer trip times, and increased vehicular queuing.

The traffic congestion incident 113 is reported based on the information received from the one or more probe vehicles 105*a* at the system 101. Based on the traffic congestion incident 113 reported based on the information received from the one or more probe vehicles 105*a*, the system 101 identifies the one or more road segments and the location information associated with the traffic congestion incident 113. Further, the system 101 is configured to generate a probe-based space-time diagram 115 based on the traffic congestion incident 113, the identified one or more road segments and the location information associated with the traffic congestion incident 113. The probe-based space-time diagram 115 comprises space-time tiles. The space-time tiles include location (road link) specific data and time specific data associated with the traffic congestion incident 113. For example, if a traffic congestion incident is reported at 12:30 at a road link 1, then a space-time tile includes details about the road link 1 and the time at which the traffic congestion incident is reported. The probe-based space-time diagram 115 is further explained as an example in FIG. 1C.

Further, the system 101 is configured to infer the ground truth for the traffic congestion incident 113. The system 101 infers the ground truth for the traffic congestion incident 113 by gathering probe data from the one or more probe vehicles 105*a* and sorting the probe data into the space-time tiles. The system 101 is configured to read the probe data from each space-time tile. The probe data includes speed data for each corresponding probe vehicle. In addition, the system 101 is configured to combine speeds of each of the one or more probe vehicles 105*a* to create partial inferred speed to be used as the inferred ground truth. Furthermore, the system 101 is configured to calculate speed based on at least one of: average or median of filtered probe data. The filtered probe data is generated by filtering out outliers within each space-time tile before averaging. The system 101 is configured to determine the most adequate ground truth by leveraging an access to the probe data before and after reporting of the traffic congestion incident 113. The inferred ground truth is complemented with at least one of or a combination of: crowd sourcing data, data received from cameras on the one or more road segments, traffic pattern data, data received from sensors of the one or more probe vehicles, or data received from traffic providers.

The system 101 compares the generated probe-based space-time diagram 115 with the inferred ground truth for quality estimation of the traffic congestion incident 113 reported by the one or more probe vehicles. The system 101 performs quality estimation to calculate the quality metric 111 for the traffic congestion incident 113 reported based on the information received from the one or more probe vehicles 105*a*.

FIG. 1C illustrates an exemplary diagram 100C depicting the probe-based space-time diagram 115 generated by the system 101, in accordance with an example embodiment. The probe-based space-time diagram 115 includes a plurality of rows 117 and a plurality of columns 119. The plurality of rows 117 includes one or more road links. In addition, the plurality of columns 119 comprises time epochs. In addition, the probe-based space-time diagram 115 includes a plurality of space-time tiles 121. For each of the plurality of rows 117 and its corresponding column of the plurality of columns 121, a space time tile is created. Each of the plurality of space-time tiles 121 includes average speed of the one or more probe vehicles 105*a* within a particular road link and time epoch. In an example, at time epoch 15:00 (3 pm), average speed of the one or more probe-vehicles 105*a* is calculated as 35 at road link "1199200697" (as shown in the exemplary diagram 100C). The average speed in the space-time tile is highlighted if the average speed is less than a threshold speed and the traffic congestion incident 113 is reported. In another example, at time epoch 15:15 and road link 572713772, the average speed is calculated as 10.

FIG. 2A illustrates an exemplary diagram 200A depicting space-time diagram 201 of an inferred ground truth for the traffic congestion incident 113, in accordance with an example embodiment. The space-time diagram 201 includes a y-axis containing road links 203 (Link 1, Link 2, Link 3), and distance 207. In addition, the space-time diagram 201 includes an x-axis depicting time epoch 205. In an example, the time epoch 205 may have duration of 5 minutes. The space-time diagram 201 includes space-time tiles 209. The space-time tiles 209 lies between the x-axis and the y-axis of the space-time diagram 201. In addition, the space-time diagram 201 includes an area 211 in which the ground truth is inferred. In an embodiment, the ground truth for the traffic congestion incident 113 lasted from 12:30 to 13:10 on Link 1 and Link 2 of the road links 203. In addition, the ground truth lasted from 0 to 600 m distance.

In an embodiment, for inferring the ground truth for the traffic congestion incident 113, the system 101 is configured to gather probe data from the one or more probe vehicles 105*a*. The probe data includes speed of the one or more probe vehicles 105*a*. Further, the system 101 sorts the probe data into the space-time tiles 209 (also shown in FIG. 1B as 121). The system 101 is further configured to read the probe data from each of the space-time tiles 209. Also, the system 101 is configured to combine speeds of each of the one or more probe vehicles 105*a* to create partial inferred speed to be used as the inferred ground truth. Moreover, the system 101 is configured to calculate speed based on at least one of average or median of filtered probe data. The filtered probe data is generated by filtering out outliers within each space-time tile before averaging. The system 101 determines the most adequate ground truth by leveraging an access to the probe data before and after reporting of the traffic congestion incident 113.

FIG. 2B illustrates an exemplary diagram 200B depicting probe-based space-time diagram 213 of the traffic congestion incident 113 reported based on the information received from the one or more probe vehicles 105*a*, in accordance with an example embodiment. The probe-based space-time diagram 213 may be the probe-based space-time diagram 115 mentioned in FIG. 1C. The probe-based space-time diagram 213 includes a y-axis containing road links 215 (Link 1, Link 2, Link 3), and distance 217. The road inks 215 may corresponds to the road links 203 of FIG. 2A. The distance 217 may corresponds to the distance 207 of FIG. 2A. In addition, the probe-based space-time diagram 213 includes an x-axis depicting time epoch 219. In an example, the time epoch 219 may have duration of 5 minutes. The time epoch 219 may correspond to the time epoch 205 of FIG. 2A. The probe-based space-time diagram 213 includes space-time tiles 221. The space-time tiles 221 lies between the x-axis and the y-axis of the probe-based space-time diagram 213. In addition, the probe-based space-time diagram 213 includes an area 223 in which the traffic congestion incident 113 is reported by the one or more probe vehicles 105*a*. In an embodiment, the traffic congestion incident 213 in the area 223 lasted from 12:30 to 13:15 on Link 2 and Link 3 of the road links 215. In addition, the traffic congestion incident 113 lasted from 200 to 700 m distance.

FIG. 3A illustrates an exemplary probe-based space-time diagram 300A for computing space-time accuracy associated with congestion incident detection, in accordance with an example embodiment. The probe-based space-time diagram 300B is created using the space-time diagram 201 (of FIG. 2A) and the probe-based space-time diagram 213 (of FIG. 2B).

The probe-based space-time diagram 300A shows overlapping of the area 211 and the area 223. The area 211 is an area in which the ground truth is inferred for the traffic congestion incident 113. The area 211 lies between distance 0 to 600 meters in a time epoch between 12:30 to 13:10 (40 minutes). The area 223 is an area in which the traffic congestion incident 113 is reported based on information received from the one or more probe vehicles 105*a*. The area 223 starts from distance 200 meters and ends at distance 700. In an embodiment, the system 101 computes the space-time accuracy as a ratio of an area 301 in the probe-based space-time diagram 300A where the traffic congestion incident 113 reported by the one or more probe vehicles 105*a* and the inferred ground truth for the traffic congestion incident 113 overlaps and the area 211 of the inferred ground truth. The area 301 is the common area of the area 211 and the area 223. The area 301 starts at distance 200 and ends at distance 600. Therefore, total distance of the area 301 is 400 meters. The area 301 has common time epoch starting from 12:35 to 13:10. Therefore, the area 301 has time epoch of duration 35 minutes.

In an example, the quality metric may be computed as below, based on the exemplary probe-based space-time diagram 300A:

$$\text{space time detection} = \frac{400\ \text{m} \cdot 35\ \text{min}}{600\ \text{m} \cdot 45\ \text{min}} = 58.3\%$$

Further, the ratio is compared with a predefined threshold for quality estimation. In an embodiment, the system 101 is configured to consider the traffic congestion incident 113 reported based on the information received from the one or more probe vehicles 105*a* accurate if the computed ratio is more than the predefined threshold.

FIG. 3B illustrates an exemplary probe-based space-time diagram 300B for computing the quality metric associated with congestion incident precision, in accordance with an example embodiment. The probe-based space-time diagram 300B is created using the space-time diagram 201 (of FIG. 2A) and the probe-based space-time diagram 213 (of FIG. 2B).

The probe-based space-time diagram 300B shows overlapping of the area 211 and the area 223. The area 211 is an area in which the ground truth is inferred for the traffic congestion incident 113. The area 211 lies between distance 0 to 600 meters in a time epoch between 12:30 to 13:10 (40 minutes). The area 223 is an area in which the traffic congestion incident 113 is reported by the one or more probe vehicles 105*a*. The area 223 starts from distance 200 meters and ends at distance of 700 meters. Therefore, distance of the area 301 is 500 meters. In an embodiment, the system 101 computes the space-time accuracy as a ratio of the area 301 in the probe-based space-time diagram 300B where the traffic congestion incident 113 reported by the one or more probe vehicles 105*a* and the inferred ground truth for the traffic congestion incident 113 overlaps and the area 223 of the reported traffic congestion incident 113. The area 301 is the common area of the area 211 and the area 223. The area 301 starts at distance 200 meters and ends at distance 600 meters. Therefore, total distance of the area 301 is 400 meters. The area 301 has common time epoch starting from 12:35 to 13:10. Therefore, the area 301 has time epoch of duration 35 minutes.

In an example, the quality metric associated with congestion incident precision may be computed as below, based on the exemplary probe-based space-time diagram 300B:

$$\text{space time precision} = \frac{400\ \text{m} \cdot 35\ \text{min}}{500\ \text{m} \cdot 40\ \text{min}} = 70\%$$

FIG. 3C illustrates an exemplary probe-based space-time diagram 300C for computing the quality metric associated with congestion incident accuracy, in accordance with an example embodiment. The probe-based space-time diagram 300B is created using the space-time diagram 201 (of FIG. 2A) and the probe-based space-time diagram 213 (of FIG. 2B).

The probe-based space-time diagram 300C shows overlapping of the area 211 and the area 223. The area 211 is an area in which the ground truth is inferred for the traffic congestion incident 113. The area 211 lies between distance 0 to 600 meters in a time epoch between 12:30 to 13:10 (40 minutes). The area 223 is an area in which the traffic congestion incident 113 is reported by the one or more probe vehicles 105*a*. The area 223 starts from distance 200 meters and ends at distance of 700 meters. Therefore, distance of the area 301 is 500 meters. In addition, the probe-based space-time diagram 300C includes an area 303 and an area 305 in which neither the reported traffic congestion incident 113 is present nor the inferred ground truth is present.

In an embodiment, the system 101 computes the space-time accuracy associated with the congestion incident accuracy as a ratio of the area in the probe-based space-time diagram 300C are in agreement (either both are present (such as 301) or none (such as area 303 and 305) is present) and total area of the probe-based space-time diagram. The area 301 is the common area of the area 211 and the area 223. The area 301 starts at distance 200 meters and ends at distance 600 meters. The area 301 has common time epoch starting from 12:35 to 13:10. Therefore, the area 301 has time epoch of duration 35 minutes. The area 303 and the area 305 are the areas in which neither the reported traffic congestion incident 113 is present nor the inferred ground truth is present.

In an example, the quality metric associated with congestion incident accuracy may be computed as below, based on the exemplary probe-based space-time diagram 300C:

$$\text{space time accuracy} = \frac{(\text{distance.time of area } 301) + (\text{distance.time of area } 303) + (\text{distance time of area } 305)}{\text{distance.time of total area of the probe} - \text{based space} - \text{time diagram } 300C}$$

$$\text{space time accuracy} = \frac{400\ \text{m}\cdot 35\ \text{min} + 100\ \text{m}\cdot 5\ \text{min} + 200\ \text{m}\cdot 5\ \text{min}}{700\ \text{m}\cdot 45\ \text{min}} = 49.2\%$$

Referring again to FIG. 1B, the system 101 is configured to perform quality estimation for a plurality of traffic congestion incidents reported based on the real time information received from the one or more probe vehicles 105*a*. For performing quality estimation for each of the plurality of traffic congestion incidents, the system 101 is configured to create the probe-based space-time diagram 115 for each of the plurality of traffic congestion incidents associated with the one or more road segments.

FIG. 4 illustrates a flowchart 400 of a method for quality estimation of the traffic congestion incident reported based on the real time information received from the one or more probe-vehicles, in accordance with an example embodiment. FIG. 4 is explained in conjunction with elements of FIGS. 1A-5. It will be understood that each step of the flowchart 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by memory of the system 101, employing an embodiment of the present invention and executed by processor of the system 101 (explained in FIG. 5). As will be appreciated, any such computer program instructions may be loaded onto a computer or other programmable apparatus (for example, hardware) to produce a machine, such that the resulting computer or other programmable apparatus implements the functions specified in the flowchart 400. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart 400.

Accordingly, the flowchart 400 supports combinations of means for performing the specified functions and combinations of operations for performing the specified functions. It will also be understood that one or more steps of the method of the flowchart 400, and combinations of steps, may be implemented by special purpose hardware-based computer systems which perform the specified functions, or combinations of special purpose hardware and computer instructions. The flowchart 400 of FIG. 4 is implemented for performing quality estimation of the traffic congestion incident reported based on the real time information received from the one or more probe vehicles 105*a*. Fewer, more, or different steps may be provided.

At step 401, the method includes identifying the one or more road segments and the location information associated with the traffic congestion incident 113 reported by the one or more probe vehicles 105*a*. In an example, the one or more road segments may corresponds to links or segments representing roads, streets, or paths, as may be used in calculating a route or recorded route information for navigation of vehicles. In an example, the one or more probe vehicles 105*a* are configured to capture road segment average speed, and report traffic congestion incident 113 for the one or more road segments.

At step 403, the method includes generating the probe-based space-time diagram 115 based on the identified one or more road segments and the location information associated with the traffic congestion incident 113 reported by the one or more probe vehicles 105*a*. The probe-based space-time diagram 115 comprises space-time tiles. The space-time tiles include location (road link) specific data and time specific data associated with the traffic congestion incident 113. For example, if a traffic congestion incident is reported at 12:30 at a road link 1, then a space-time tile includes details about the road link 1 and the time at which the traffic congestion incident is reported (explained in FIG. 1C).

At step 405, the method includes inferring ground truth for the traffic congestion incident. The ground truth for the traffic congestion incident 113 is inferred by gathering probe data from the one or more probe vehicles 105*a* and sorting the probe data into the space-time tiles. Further, the probe data is read from each space-time tile. In addition, speeds of each of the one or more probe vehicles 105*a* are combined to create partial inferred speed to be used as the inferred ground truth. Furthermore, speed is calculated based on at least one of: average or median of filtered probe data. The filtered probe data is generated by filtering out outliers within each space-time tile before averaging. The most adequate ground truth is determined by leveraging an access to the probe data before and after reporting of the traffic congestion incident 113. The inferred ground truth is complemented with at least one of or a combination of: crowd sourcing data, data received from cameras on the one or more road segments, traffic pattern data, data received from sensors of the one or more probe vehicles, or data received from traffic providers.

At step 407, the method includes comparing the generated probe-based space-time diagram 115 with the inferred ground truth for quality estimation of the traffic congestion incident 113 reported by the one or more probe vehicles 105*a*. The method further includes computing a quality metric for the traffic congestion incident based on the comparison. In one embodiment, the quality metric is the space-time accuracy for quality estimation of the traffic congestion incident 113 (as explained in FIGS. 3A-3C). In another embodiment, the quality metric is space time precision as described on FIG. 3B. In another embodiment, the quality metric is space time detection ratio, as described in FIG. 3A.

The method may be implemented using corresponding circuitry. For example, the method may be implemented by an apparatus or system comprising a processor, a memory, and a communication interface of the kind discussed in conjunction with FIG. 5.

FIG. 5 illustrates a block diagram of the system for quality estimation of the traffic congestion incident 113 reported by the one or more probe-vehicles 105*a*, in accordance with an example embodiment.

The system 101 includes a processor 501, a memory 503, and a communication interface 505. The processor 501 is configured to perform some or each of the operations of the method of FIG. 4. The processor 501 may, for example, be configured to perform the steps (401-407) by performing hardware implemented logical functions, executing stored instructions, or executing algorithms for performing each of the operations. Alternatively, the system 101 may comprise means for performing each of the operations described above. In this regard, according to an example embodiment, examples of means for performing steps (401-407) may comprise, for example, the processor 501 which may be implemented in the system 101 and/or a device or circuit for executing instructions or executing an algorithm for processing information as described above.

In an example embodiment, the processor 501 may be in communication with the memory 503 via a bus for passing information among components coupled to the system 101. The memory 503 may be non-transitory and may include, for example, one or more volatile and/or non-volatile memories. In other words, for example, the memory 503 may be an electronic storage device (for example, a computer readable storage medium) comprising gates configured to store data (for example, bits) that may be retrievable by a machine (for example, a computing device like the processor 501). The memory 503 may be configured to store information, data, content, applications, instructions, or the like, for enabling the apparatus to carry out various functions in accordance with an example embodiment of the present invention. For example, the memory 503 may be configured to buffer input data for processing by the processor 501. The memory 503 may be solid-state memory, a hard disk drive (HDD), read-only memory (ROM), random-access memory (ROM), flash memory or another type of memory. For example, memory 503 may be configured to store computer program instructions which, when executed by processor 501, cause system 101 to perform the method as described in FIG. 4. Further, the memory 503 may be configured to store instructions for execution by the processor 501.

As such, whether configured by hardware or software methods, or by a combination thereof, the processor 501 may represent an entity (for example, physically embodied in circuitry) capable of performing operations according to an embodiment of the present invention while configured accordingly. Thus, for example, when the processor 501 is embodied as an ASIC, FPGA or the like, the processor 501 may be specifically configured hardware for conducting the operations described herein. Alternatively, as another example, when the processor 501 is embodied as an executor of software instructions, the instructions may specifically configure the processor 501 to perform the algorithms and/or operations described herein when the instructions are executed. However, in some cases, the processor 501 may be a processor specific device (for example, a mobile terminal or a fixed computing device) configured to employ an embodiment of the present invention by further configuration of the processor 501 by instructions for performing the algorithms and/or operations described herein. The processor 501 may include, among other things, a clock, an arithmetic logic unit (ALU) and logic gates configured to support operation of the processor 501.

In an example embodiment, the system 101 may be embodied in one or more of several ways as per the required implementation. For example, the system 101 may be embodied as a cloud-based service or a cloud-based platform. In each of such embodiments, the system 101 may be communicatively coupled to the components shown in FIG. 1 to carry out the desired operations and wherever required modifications may be possible within the scope of the present disclosure.

The system 101 may be accessed using the communication interface 505. The communication interface 501 may provide an interface for accessing various features and data stored in the system 101. The communication interface 505 may comprise input interface and output interface for supporting communications to and from the system 101 or any other component with which the system 101 may communicate. The communication interface 501 may be any means such as a device or circuitry embodied in either hardware or a combination of hardware and software that is configured to receive and/or transmit data to/from a communications device in communication with the system 101. In this regard, the communication interface 501 may include, for example, an antenna (or multiple antennae) and supporting hardware and/or software for enabling communications with a wireless communication network. Additionally, or alternatively, the communication interface 505 may include the circuitry for interacting with the antenna(s) to cause transmission of signals via the antenna(s) or to handle receipt of signals received via the antenna(s). In some environments, the communication interface 501 may alternatively or additionally support wired communication. As such, for example, the communication interface 501 may include a communication modem and/or other hardware and/or software for supporting communication via cable, digital subscriber line (DSL), universal serial bus (USB) or other mechanisms. In some embodiments, the communication interface 801 may enable communication with a cloud-based network to enable deep learning.

In some example embodiments, a computer programmable product may be provided. The computer programmable product may comprise at least one non-transitory computer-readable storage medium having stored thereon computer-executable program code instructions that when executed by a computer, cause the computer to execute the method of FIG. 4.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for quality estimation of a traffic congestion incident, comprising:

at least one non-transitory memory configured to store computer executable instructions; and at least one processor configured to execute the computer executable instructions to:

identify one or more road segments and location information associated with the traffic congestion incident, based on information from one or more probe vehicles;

generate a probe-based space-time diagram based on the identified one or more road segments and the location information associated with the traffic congestion incident based on the information from the one or more probe vehicles;

infer ground truth for the traffic congestion incident by:

gathering probe data from the one or more probe vehicles, the probe data including speed data of each of the one or more probe vehicles;

sorting the probe data into one or more space-time tiles;

filtering outliers within each of the one or more space-time tiles to determine filtered probe data; and combining the speed data of the one or more probe vehicles based on the filtered probe data to create an inferred speed to be used as the inferred ground truth;

compare the generated probe-based space-time diagram with the inferred ground truth for quality estimation of the traffic congestion incident based on the information from the one or more probe vehicles by computing a quality metric as a ratio of an overlapping area where the traffic congestion incident in the probe-based space-time diagram and the inferred ground truth overlap, and an area of the inferred ground truth; and adjust a route guidance function of a navigation system based on the computed quality metric.

2. The system of claim 1, wherein the probe-based space-time diagram comprises space-time tiles.

3. The system of claim 1, wherein the inferred ground truth is complemented with at least one of or a combination of: crowd sourcing data, data received from cameras on the one or more road segments, traffic pattern data, data received from sensors of the one or more probe vehicles, or data received from traffic providers.

4. The system of claim 1, wherein the quality metric is determined as accurate based on the computed ratio being more than the predefined threshold.

5. The system of claim 1, wherein the at least one processor is configured to perform quality estimation for a plurality of traffic congestion incidents.

6. The system of claim 5, wherein to perform quality estimation for each of the plurality of traffic congestion incidents, the at least one processor is configured to create a probe-based space-time diagram for each of the plurality of traffic congestion incidents associated with the one or more road segments.

7. A method for quality estimation of a traffic congestion incident, the method comprising:

identifying one or more road segments and location information associated with the traffic congestion incident based on the information from the one or more probe vehicles;

generating a probe-based space-time diagram based on the identified one or more road segments and the location information associated with the traffic congestion incident based on the information from the one or more probe vehicles;

inferring ground truth for the traffic congestion incident based on the probe-based space- time diagram by:

gathering probe data from the one or more probe vehicles, the probe data including speed data of each of the one or more probe vehicles;

sorting the probe data into one or more space-time tiles;

filtering outliers within each of the one or more space-time tiles to determine filtered probe data; and combining the speed data of the one or more probe vehicles based on the filtered probe data to create an inferred speed to be used as the inferred ground truth;

comparing the generated probe-based space-time diagram with the inferred ground truth for quality estimation of the traffic congestion incident based on the information from the one or more probe vehicles by computing a quality metric as a ratio of: an overlapping area where the traffic congestion incident in the probe-based space-time diagram and the inferred ground truth overlap, and an area of the inferred ground truth; and adjusting a route guidance function of a navigation system based on the computed quality metric.

8. The method of claim 7, wherein the probe-based space-time diagram comprises space-time tiles.

9. The method of claim 7, wherein the inferred ground truth is complemented with at least one of or a combination of: crowd sourcing data, data received from cameras on the one or more road segments, traffic pattern data, data received from sensors of the one or more probe vehicles, or data received from traffic providers.

10. The method of claim 7, wherein the quality metric is determined as accurate based on the computed ratio being more than the predefined threshold.

11. The method of claim 7, further comprising: performing quality estimation for a plurality of traffic congestion incidents.

12. The method of claim 11, wherein to perform quality estimation for each of the plurality of traffic congestion incidents, the method further comprises creating a probe-based space-time diagram for each of the plurality of traffic congestion incidents associated with the one or more road segments.

13. A non-transitory computer-readable storage medium having computer program code instructions stored therein, the computer program code instructions, when executed by at least one processor, cause the at least one processor to:

identify one or more road segments and location information associated with a traffic congestion incident based on information from one or more probe vehicles;

generate a probe-based space-time diagram based on the identified one or more road segments and the location information associated with the traffic congestion incident based on the information from the one or more probe vehicles;

infer ground truth for the traffic congestion incident based on the probe-based space-time diagram by:

gathering probe data from the one or more probe vehicles, the probe data including speed data of each of the one or more probe vehicles;

sorting the probe data into one or more space-time tiles;

filtering outliers within each of the one or more space-time tiles to determine filtered probe data; and combining the speed data of the one or more probe vehicles based on the filtered probe data to create an inferred speed to be used as the inferred ground truth;

compare the generated probe-based space-time diagram with the inferred ground truth for quality estimation of the traffic congestion incident based on the information from the one or more probe vehicles by computing a quality metric as a ratio of an overlapping area where the traffic congestion incident in the probe-based space-time diagram and the inferred ground truth overlap, and an area of the inferred ground truth; and adjust a route guidance function of a navigation system based on the computed quality metric.

* * * * *